(12) United States Patent
Kim et al.

(10) Patent No.: US 11,149,861 B2
(45) Date of Patent: Oct. 19, 2021

(54) GATE VALVE WITH DISK REPLACEMENT STRUCTURE

(71) Applicants: Jae Hyun Kim, Seoul (KR); Do Wan Kim, Seoul (KR)

(72) Inventors: Jae Hyun Kim, Seoul (KR); Do Wan Kim, Seoul (KR)

(73) Assignees: Jae Hyun Kim, Seoul (KR); Do Wan Kim, Seoul (KR)

( * ) Notice: Subject to any disclaimer, the term of this patent is extended or adjusted under 35 U.S.C. 154(b) by 733 days.

(21) Appl. No.: 15/779,864

(22) PCT Filed: Apr. 4, 2017

(86) PCT No.: PCT/KR2017/003677
§ 371 (c)(1),
(2) Date: May 30, 2018

(87) PCT Pub. No.: WO2018/117340
PCT Pub. Date: Jun. 28, 2018

(65) Prior Publication Data
US 2021/0172537 A1    Jun. 10, 2021

(30) Foreign Application Priority Data
Dec. 21, 2016 (KR) .................. 10-2016-0175666

(51) Int. Cl.
*F16K 3/314* (2006.01)
*F16K 3/02* (2006.01)
*F16K 31/50* (2006.01)

(52) U.S. Cl.
CPC ........... *F16K 3/314* (2013.01); *F16K 3/0254* (2013.01); *F16K 31/508* (2013.01)

(58) Field of Classification Search
CPC .............................. F16K 3/0254; F16K 3/281
(Continued)

(56) References Cited

U.S. PATENT DOCUMENTS 3,215,399 A * 11/1965 McInerney ............. F16K 3/314
251/195
3,654,962 A * 4/1972 Fredd .................. F16K 11/0873
137/625.11
(Continued)

FOREIGN PATENT DOCUMENTS

JP    2001-193892 A   7/2001
KR   10-1998-0033714 A   7/1998
(Continued)

OTHER PUBLICATIONS

International Search Report for PCT/KR2017/003677 dated Sep. 4, 2017.

*Primary Examiner* — Kevin R Barss (57) ABSTRACT

Provided is a gate valve with a disk replacement structure. The gate valve is installed on a pipe, and comprises: a valve body having a blocking space formed therein, a pair of flange pipes formed to communicate with the blocking space, and a cover mounted on an upper side thereof to close the blocking space; a disk arranged in the blocking space to be lifted and provided with a mounting hole which is formed on an upper surface thereof and has a lifting nut therein; and an operating rod installed on the cover to lift the disk. An insertion hole is formed on the cover to penetrate the cover.

4 Claims, 6 Drawing Sheets

(58) Field of Classification Search
USPC .................................................. 251/113, 328
See application file for complete search history.

(56) References Cited

U.S. PATENT DOCUMENTS

| | | | | |
|---|---|---|---|---|
| 4,513,823 A * | 4/1985 | Hynes | ..................... | E21B 34/04 |
| | | | | 166/316 |
| 4,651,970 A * | 3/1987 | Sadler | ..................... | E21B 29/04 |
| | | | | 251/297 |
| 6,672,565 B2 * | 1/2004 | Russell | ................ | E21B 21/106 |
| | | | | 251/297 |
| 9,451,394 B2 * | 9/2016 | Barnes | ..................... | H04L 67/16 |
| 9,482,255 B2 * | 11/2016 | Changsrivong | ......... | F16B 17/00 |
| 9,829,028 B2 * | 11/2017 | Changsrivong | ....... | F16B 21/186 |
| 9,882,332 B2 * | 1/2018 | Frederick | ............. | H01R 4/4863 |
| 10,894,595 B1 * | 1/2021 | Wright | ................ | B64C 13/343 |
| 2009/0020719 A1 * | 1/2009 | Ishigaki | ................ | F16K 3/0281 |
| | | | | 251/326 |

FOREIGN PATENT DOCUMENTS

| | | |
|---|---|---|
| KR | 20-0257077 B1 | 12/2001 |
| KR | 10-1287910 B1 | 7/2013 |
| KR | 10-2014-0032798 A | 3/2014 |

* cited by examiner

GATE VALVE WITH DISK REPLACEMENT STRUCTURE

CROSS REFERENCE TO RELATED APPLICATIONS

This application claims priority to Korean Patent Application No. 10-2016-0175666, filed on Dec. 21, 2016. Further, the application is the National Phase application of International Application No. PCT/KR2017/003677, filed on Apr. 4, 2017, which designates the United States. Each of these applications is hereby incorporated by reference in their entirety into the present application.

FIELD

Embodiments of the present invention relate to a gate valve having a disk replacement structure, and more particularly, to a gate valve having a disk replacement structure in which a disk and various parts can be replaced in a state where a piping is shut off and in a state where the gate valve is opened so that an object can move by providing a fixing member in the gate valve disposed in the piping for controlling the movement of the object and allowing the disk to be supported and fixed by the fixing member, so that it is not necessary to provide a separate device for blocking the movement of the object for replacement, the replacement time is shortened, and the replacement cost is reduced.

BACKGROUND

In general, a gate valve is an opening/closing device used to control the flow of fluid in a piping. The flow of the fluid can be controlled as a disk inside the gate valve and a valve body come into close contact with each other and the airtightness becomes better.

The performance of the gate valve varies greatly depending on the structure of the disk. In particular, in order to improve the airtightness of the gate valve, the close contact between the disk and the valve body must be very close to each other, thereby controlling the flow of the fluid.

Therefore, friction occurs between the valve seat and the valve body, thereby causing a surface of the valve seat to be worn out, resulting in a gap. The leakage of the fluid occurs through the gap so that the airtightness is considerably deteriorated.

In addition, in the process of raising and lowering the disk by a screw, the thread is worn out or the O-ring of the valve is corroded, thereby causing leakage.

Conventionally, when the leakage of the valve occurs, the pipe connected to the valve is closed by a non-water blockage piping work method to replace the disk, O-ring, and lifting parts. Then, after a connection pipe is disposed for circulation, fluid and gas moving through the piping are branched by the connection pipe, and then they are replaced.

However, in the conventional valve replacement method, there is a troublesome problem that a hole is formed in the piping and the connection pipe is provided according to the non-water blockage piping work method. Since it is necessary to additionally provide a shutoff device for shutting off liquid and gas moving through the piping, there is a problem that the replacement time is long and the replacement cost is excessively increased.

The above-described invention means the background art of the technical field to which the present invention belongs, and does not mean the prior art.

PRIOR ART DOCUMENT

Patent Literature

Korean Patent Application No. 10-2014-0132194

DISCLOSURE

Technical Problem

The present invention has been developed in order to overcome the above drawbacks and other problems. An object of the present invention is to provide a gate valve having a disk replacement structure which is provided in a piping and controls the movement of an object, wherein fixing members are provided in the gate valve and a disk is supported and fixed by the fixing members so that the disk and various parts can be replaced in a state where the piping is blocked and in a state where the gate valve is opened to allow the object to move through the piping, it is not necessary to dispose a separate device for shutting off the movement of the object for the replacement, the replace time is shortened, and the replacement cost is reduced.

Technical Solution

In order to achieve the above object, the present invention may provide a gate valve having a disk replacement structure and disposed in a piping which includes a valve body including a blocking space formed therein, a pair of flange pipes provided to communicate with the blocking space, and a cover coupled to an upper portion of the valve body to close the blocking space;

a disk provided to be lifted up and down in the blocking space and including a coupling hole in an upper portion of which a lifting nut is disposed; and an operating rod disposed in the cover and configured to move the disk up and down, wherein the cover is provided with an insertion hole to penetrate through the cover, and the operating rod is rotatably disposed in the insertion hole, wherein the valve body is provided with a fixing member configured to support and fix the disk, and wherein the disk is provided with engaging grooves having an upper inclined surface and a lower inclined surface on both side surfaces or front and rear surfaces to be pressed and fixed by the fixing member.

The disk may be provided with support slopes on both sides of an upper portion thereof to be pressed and fixed by the fixing member.

A jaw part may be formed on an upper side of the blocking space to protrude inward and a hermetic protrusion configured to press the jaw part so as to maintain airtightness of the blocking space may be formed in the upper portion of the disk.

The lifting nut may be disposed on an upper portion of the coupling hole, and the disk may be moved upward by a forward rotation of the operating rod screwed with the lifting nut so that the flange pipes are opened and the operating rod is inserted into a lower portion of the coupling hole. When the operating rod is rotated in a reverse direction, the disk may be moved downward while closing the flange pipes.

The fixing member may include a pair of fastening holes formed in the valve body in an oblique or horizontal direction and communicating with the blocking space, fixing tubes inserted into and fixed to the fastening holes and having a threaded portion formed on an inner circumferential surface thereof, and pressing rods which are screwed with the fixing tubes and press the disk by rotation.

Advantageous Effects

With a gate valve having a disk replacement structure according to an embodiment of the present invention, the gate valve is provided in a piping and controls movement of an object, a fixing member is provided in the gate valve, and a disk is supported and fixed by the fixing member, so that the disk and various parts can be replaced in a state where the piping is blocked. Also, since the disk and various parts can be replaced in a state where the gate valve is opened to allow the object to move through the piping, it is not necessary to dispose a separate device for shutting off the movement of the object for the replacement, replacement time may be shortened, and replacement cost may be reduced.

BEST MODE FOR CARRYING OUT THE INVENTION

Hereinafter, preferred embodiments of a gate valve having a disk replacement structure according to the present invention will be described with reference to the accompanying drawings. In this process, the thickness of the lines and the sizes of the components shown in the drawings may be exaggerated for clarity and convenience of explanation. In addition, the terms described below are defined in consideration of the functions of the present invention, which may vary depending on the intention or custom of the user and the operator. Therefore, the definitions of these terms should be made based on the contents throughout this specification.

In addition, the following embodiments are not intended to limit the scope of the present invention, but merely as examples, and various embodiments may be implemented through the present invention.

Figure 1:
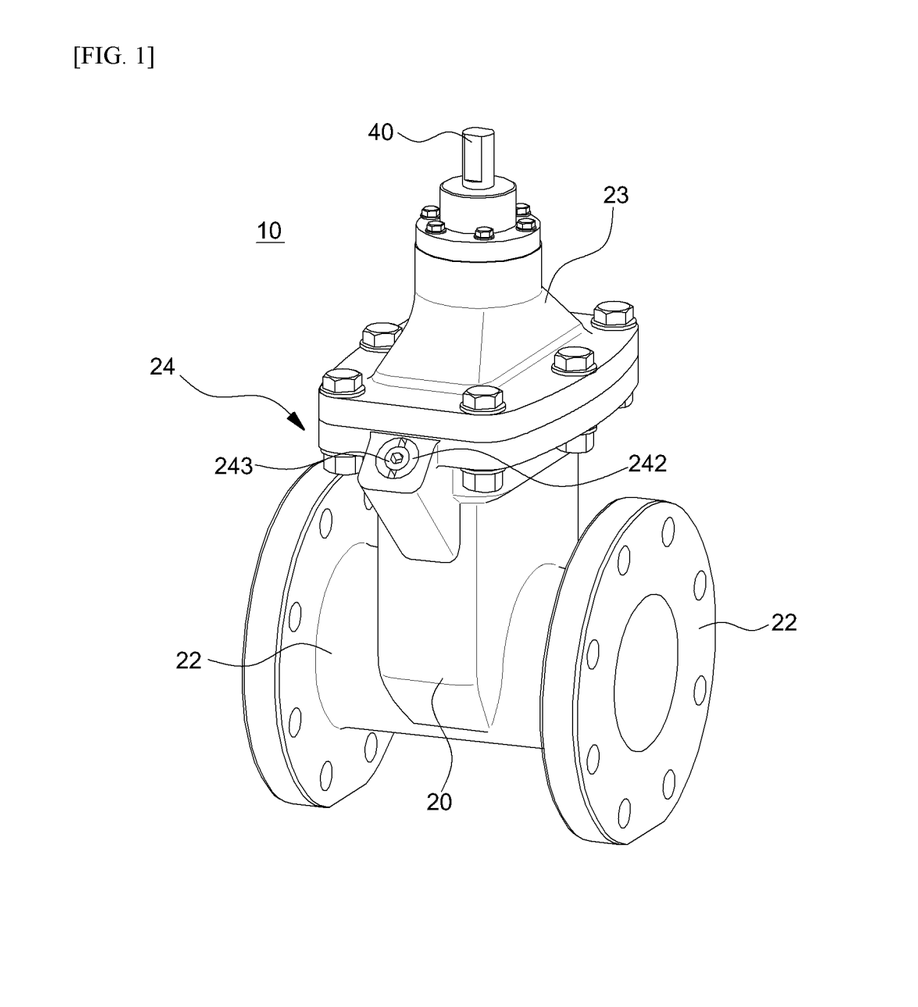
FIG. 1 is a perspective view illustrating a gate valve having a disk replacement structure according to the present invention.
Figure 2:
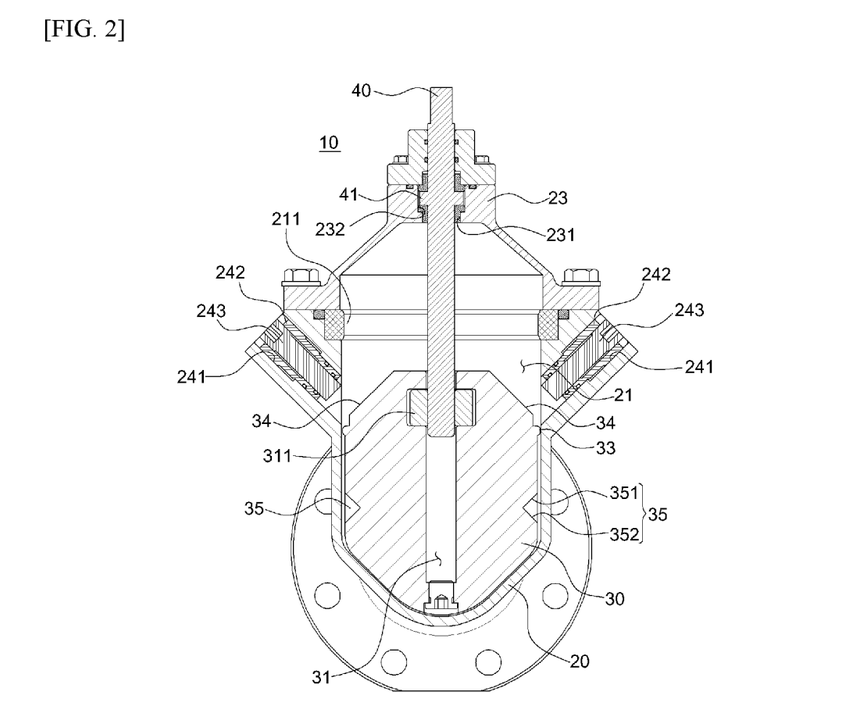
FIG. 2 is a cross-sectional view illustrating a gate valve having a disk replacement structure according to the present invention.
Figure 3:
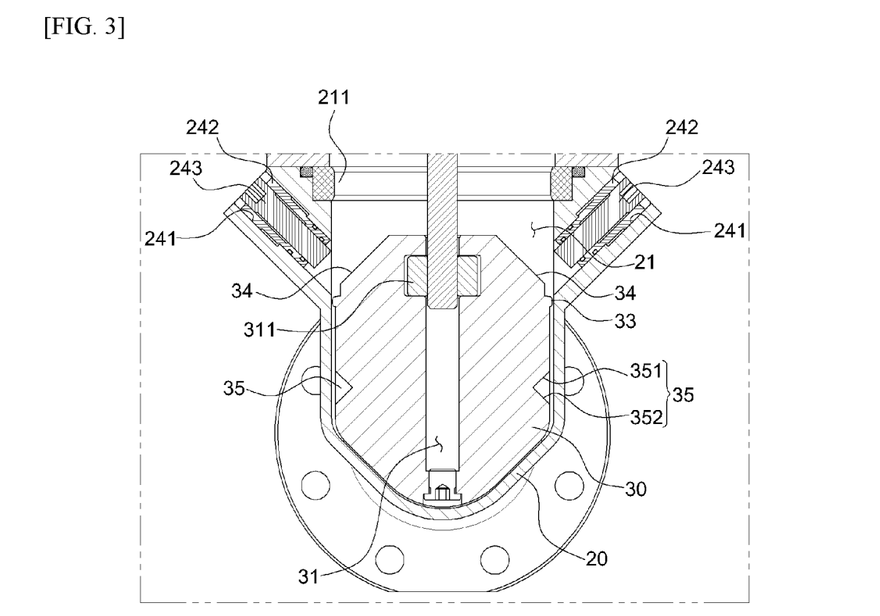
FIG. 3 is a cross-sectional view illustrating a disk of a gate valve having a disk replacement structure according to the present invention.
Figure 4:
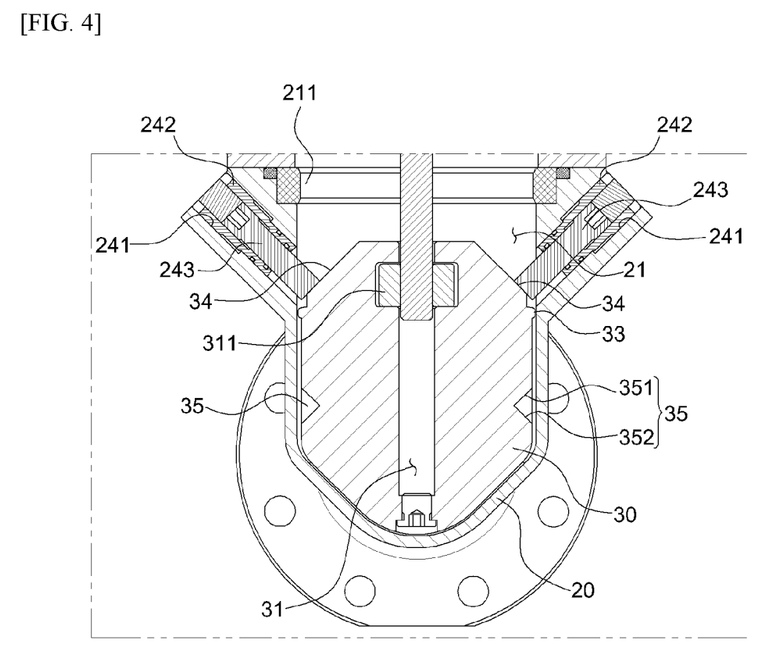
FIG. 4 is a cross-sectional view illustrating a state in which an upper portion of a disk is fixed in a gate valve having a disk replacement structure according to the present invention.
Figure 5:
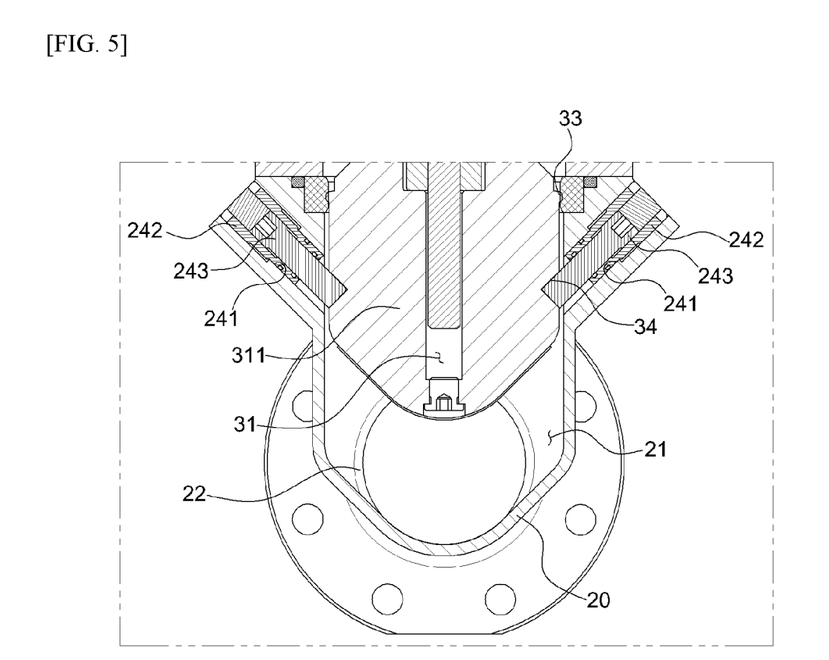
FIG. 5 is a cross-sectional view illustrating a state in which a side surface of a disk is fixed in a gate valve having a disk replacement structure according to the present invention.
Figure 6:
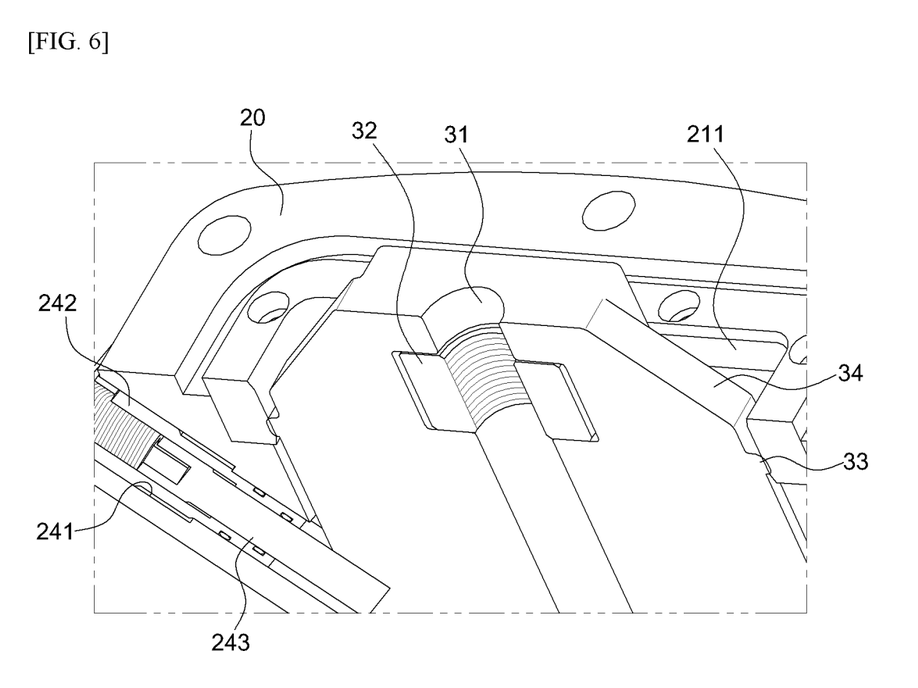
FIG. 6 is a view illustrating a state in which an upper portion of a disk presses a jaw part and watertightness is maintained in a gate valve having a disk replacement structure according to the present invention.
Figure 7:
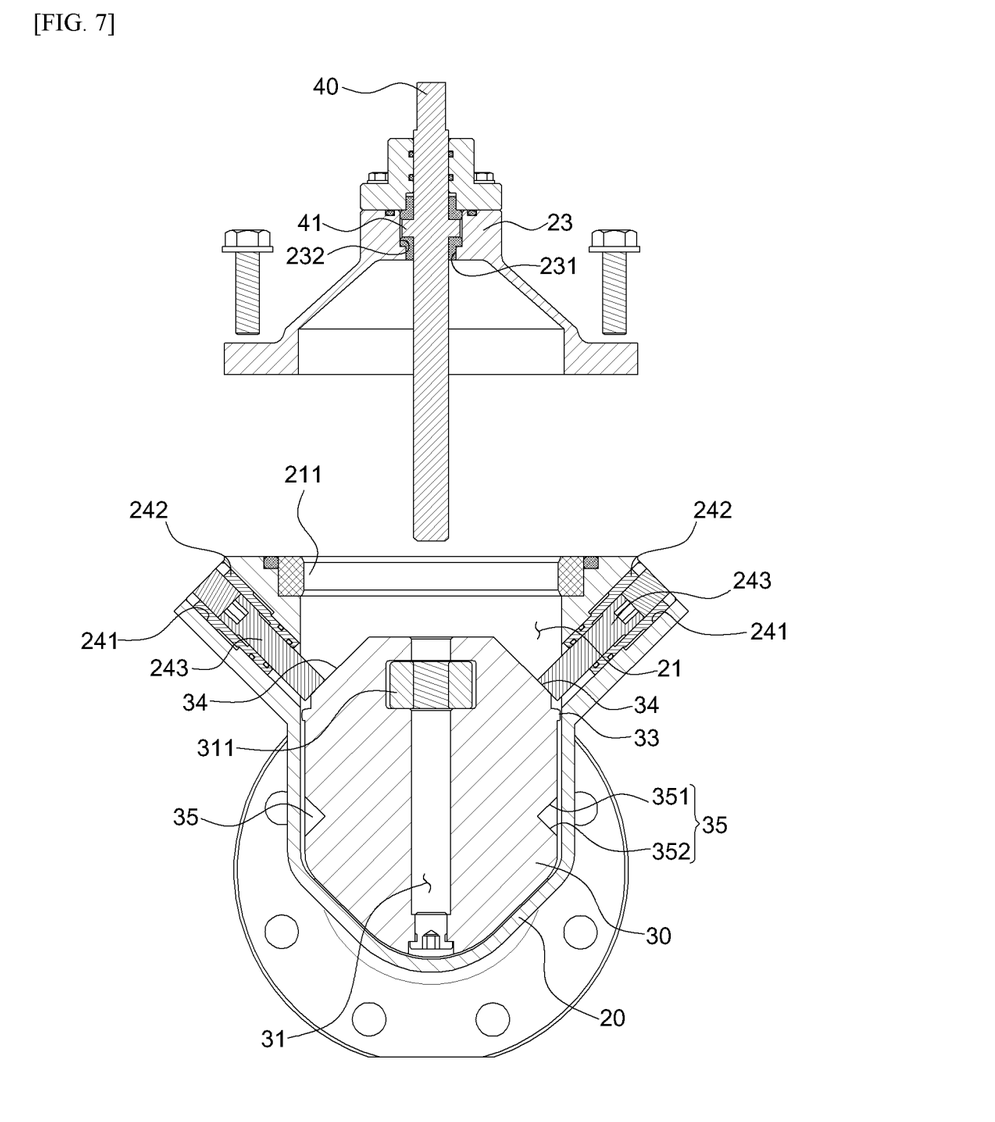
FIG. 7 is a view illustrating a process of replacing a disk in a gate valve having a disk replacement structure according to the present invention.
Figure 8:
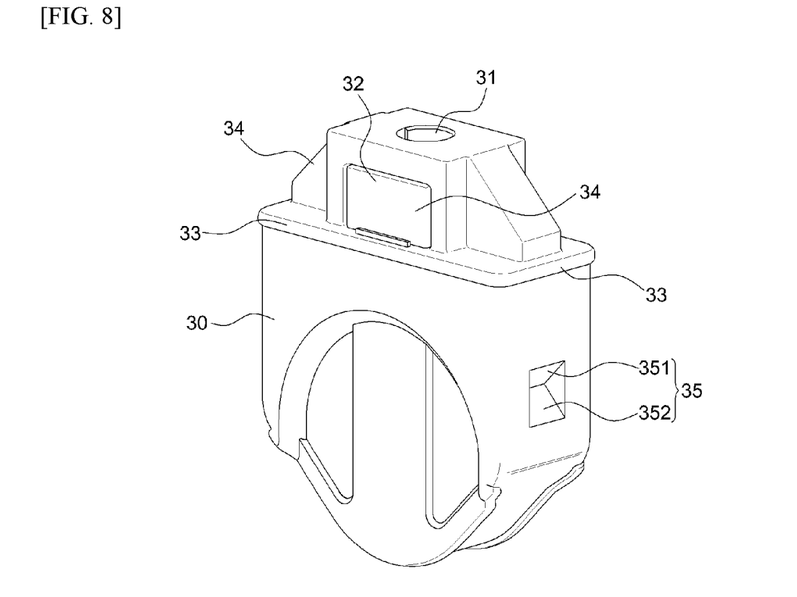
FIG. 8 is a view illustrating a disk of a gate valve having a disk replacement structure according to the present invention.
Figure 9:
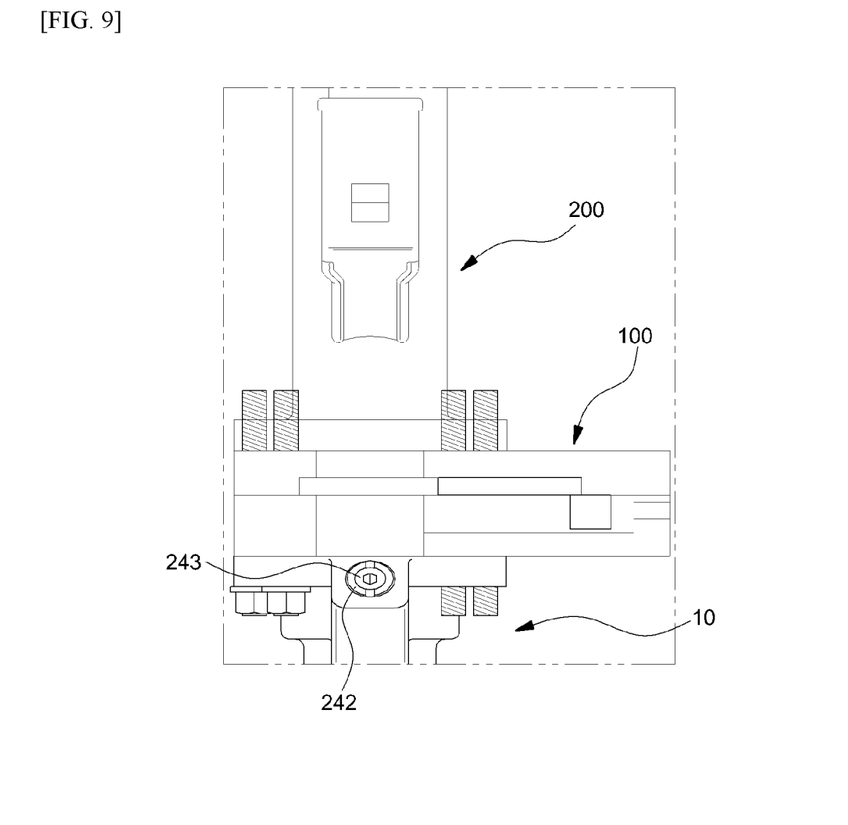
FIG. 9 is a view illustrating a state in which a disk replacing device is disposed in a gate valve having a disk replacement structure according to the present invention.

FIG. 1 is a perspective view illustrating a gate valve having a disk replacement structure according to the present invention. FIG. 2 is a cross-sectional view illustrating a gate valve having a disk replacement structure according to the present invention. FIG. 3 is a cross-sectional view illustrating a disk of a gate valve having a disk replacement structure according to the present invention. FIG. 4 is a cross-sectional view illustrating a state in which an upper portion of a disk is fixed in a gate valve having a disk replacement structure according to the present invention. FIG. 5 is a cross-sectional view illustrating a state in which a side surface of a disk is fixed in a gate valve having a disk replacement structure according to the present invention. FIG. 6 is a view illustrating a state in which an upper portion of a disk presses a jaw part and the watertightness is maintained in a gate valve having a disk replacement structure according to the present invention. FIG. 7 is a view illustrating a process of replacing a disk in a gate valve having a disk replacement structure according to the present invention. FIG. 8 is a view illustrating a disk of a gate valve having a disk replacement structure according to the present invention. FIG. 9 is a view illustrating a state in which a disk replacing device is disposed in a gate valve having a disk replacement structure according to the present invention.

As illustrated in the drawings, a gate valve 10 having a disk replacement structure (hereinafter, referred to as a 'gate valve' for convenience of explanation) according to the present invention is a gate valve 10 provided in a piping and configured to control movement of an object such as a fluid or gas moving through the piping to block or allow the object to move. The gate valve 10 includes a valve body 20, a disk 30, and an operating rod 40.

The valve body 20 is made of a metal material or a synthetic resin material and has a blocking space 21 formed therein and a pair of flange pipes communicating with the blocking space 21. A cover 23 is fastened to the upper portion of the valve body 20 to close the blocking space 21.

The cover 23 is detachably fixed to the upper portion of the valve body 20 by screws.

The piping is connected to the flange pipes 22, respectively, so that the object is moved through the blocking space 21.

The cover 23 is formed with an insertion hole 231 penetrating through the cover 23 as illustrated in FIG. 2, and the operating rod 40 is inserted through the insertion hole 231.

The disk 30 is made of a synthetic resin material or a synthetic resin material having elasticity and is disposed to be lifted up and down in the blocking space 21. The disk 30 is provided with a coupling hole 31 that is formed in the upper inner surface of the coupling hole 31 and has a lifting nut 32.

The lifting nut 32 is inserted in and fixed to the coupling hole 31. The lifting nut 32 is inserted into the coupling hole 31, and is then fixed by fusion or adhesion.

The coupling hole 31 is formed to penetrate the disk 30, and then a stopper may be fastened to the lower end of the coupling hole 31 as illustrated in FIG. 2. Alternatively, the coupling hole 31 may be formed in a structure in which the lower portion thereof is closed.

The lifting nut 32 is disposed on the upper portion of the coupling hole 31 as illustrated in FIG. 2, so that when the operating rod 40 screwed to the lifting nut 32 rotates in the forward direction, the disk 30 is moved upward to open the flange pipes 22 and the operating rod 40 is inserted into the lower portion of the coupling hole 31 as illustrated in FIG. 5. When the operating rod 40 rotates in the reverse direction, the disk 30 is moved downward while closing the flange pipes 22 as illustrated in FIG. 4.

The operating rod 40 is provided in the cover 23 and moves the disk 30 up and down.

The operating rod 40 is made of a metal material and has a screw thread formed on the outer surface of the operating rod 40 to be screwed to the lifting nut 32.

At this time, an annular locking protrusion 41 is formed on the outer circumferential surface of the operating rod 40. The cover 23 may be provided with an operating groove 232 communicating with the insertion hole 231 so that the locking protrusion 41 is engaged with and rotates in the operating groove 232. The operating groove 232 may be further provided with a pair of bushing.

Alternatively, a bearing may be provided in the operating groove 232 and the operating rod 40 is inserted into the bearing so that the disk 30 can be moved up and down by the rotation of the operating rod 40.

Here, a jaw part 211 is formed on the inner circumferential surface of the upper portion of the blocking space 21 of the valve body 20 to protrude inward. A hermetic protrusion 33 for pressing the jaw part 211 and maintaining the airtightness of the blocking space 21 is further formed on the upper portion of the disk 30.

The jaw part 211 is preferably formed to protrude integrally from the valve body 20. Alternatively, a fixing groove may be formed on the upper portion of the blocking space 21 and a fixing frame may be fixed to the fixing groove by screws or welding. The inner surface of the fixing frame may protrude inward of the blocking space 21.

At this time, the valve body 20 is provided with a fixing member 24 for supporting and fixing the disk 30. The disk 30 is provided with support slopes 34 or other types of support surfaces on both sides of the upper portion thereof so as to be pressed and fixed by the fixing member 24.

In addition, the valve body 20 is provided with the fixing member 24 for supporting and fixing the disk 30. The disk 30 is further provided with engaging grooves 35 having an upper inclined surface 351 and a lower inclined surface 352 on both side surfaces (front and rear surfaces in some cases) so as to be pressed and fixed by the fixing member 24.

The fixing member 24 may include a pair of fastening holes 241 formed in the diagonal or horizontal direction of the valve body 20 and configured to communicate with the blocking space 21, a pair of fixing tubes 242 that are inserted into and fixed to the fastening holes 241 and have a threaded portion formed on the inner circumferential surface thereof, and a pair of pressing rods 243 that are screwed with the fixing tubes 242 and press the disk 30 by rotation.

In other words, when the operating rod 40 is broken and the disk 30 cannot be lifted, the upper inclined surfaces 351 of the disk 30 are pressed by the fixing member 24 so that the disk 30 is fixed as illustrated in FIG. 4. Then, the cover 23 and the operating rod 40 are separated, and then a shutoff valve and a replacing device of the disk 30 are disposed in the valve body 20. After the fixing member 24 releases the fixing of the disk 30, the disk 30 is replaced by the replacing device of the disk 30.

Further, when the operating rod 40 is not broken, the disk 30 is lifted up and fixed by the fixing member 24 as illustrated in FIG. 5 so that the object is allowed to flow. As described above, after the cover 23 is removed and the shutoff valve and the replacing device of the disk 30 are disposed, the disk 30 is replaced. Therefore, the disk 30 may be replaced without blocking the object.

Here, the fixing member 24 may include a pair of fastening holes 241 and cylinders provided in the fastening holes 241 to press the disk 30.

In addition, an elastic spring is welded to an end of the pressing rod 243 and an elastic block made of synthetic resin having elasticity is fused to an end of the elastic spring. When the pressing rod is moved toward the disk 30, the disk is urged and fixed by the elasticity of the elastic spring and the elastic block. Also, when the disk is vibrated by the object moved through the gate valve, the elastic spring and the elastic block buffer the vibration transmitted to the pressing rods so that the pressing rods 40 may be prevented from being unwound from the fixing tubes 242.

An example of a disk replacing method of a gate valve having the disk replacement structure constructed as described above is as follows. In the disk replacing method of replacing the disk 30 of the gate valve 10 in a state in which a moving object is moved in the piping, a disk fixing step of inserting the end portions of the fixing shafts of the fixing member 24 provided in the valve body 20 into the engaging grooves 35 of disk 30 moved upward in the blocking space 21 of the valve body 20 so as to fix the disk 30, a cover separating step of separating the cover 23 from the valve body 20, and an operating rod separating step of separating the operating rod 40 from the disk 30 may be performed.

Next, a shutoff valve disposing step of disposing a shutoff valve in the valve body 20 from which the cover 23 is detached, a disk replacing device disposing step of disposing a disk replacing device 200 in the upper portion of the shutoff valve 300, a fixing releasing step of separating the fixing shafts of the fixing member 24 from the engaging grooves 35, a disk separating step of taking out the disk 30 by the disk replacing device 200 and closing the shutoff valve, and a finishing step of sequentially opening the shutoff valve 300, engaging the disk 30 and the operating rod 40, separating the disk replacing device 200 and the shutoff valve 300, and connecting the cover 23 to the valve body 20 may be performed, thereby completing a series of processes.

Further, a disk replacing method of replacing the disk 30 of the gate valve 10 in a state in which the moving object is shut in the piping may include a disk fixing step of causing the end portion of the fixing shafts of the fixing member 24 provided in the valve body 20 to press the upper inclined surfaces 351 formed on the upper side of the disk 30 moved downward in the blocking space 21 of the valve body 20 so as to fix the disk 30. Since the series of processes after the disk fixing step is the same as the above-described processes, detailed descriptions thereof are omitted.

Here, the shutoff valve and the disk replacing device 200 are generally used for replacing the piping or the parts of the valve. Therefore, detailed operation and configuration thereof are omitted.

In the gate valve having a disk replacement structure according to the present invention as described above, the disk or the parts of the gate valve can be replaced in the process in which the fluid or the gas is moved through the piping. Therefore, excessive cost and delays in the construction period caused by replacing the disk or the parts of the gate valve in a state where the piping is shutoff may not occur.

The one embodiment of the present invention described above is merely illustrative. It will be understood by those skilled in the art that various changes and modifications may be made without departing from the scope of the present invention. It is therefore to be understood that the present invention is not limited to the specific embodiments shown and described herein. Accordingly, the true scope of the present invention should be determined by the technical idea of the appended claims. It is also to be understood that the present invention includes all modifications, equivalents, and alternatives within the spirit and scope of the present invention as defined by the appended claims.

| [Description of the reference numerals] |
| --- |
| 10: gate valve |
| 20: valve body |
| 21: blocking space |
| 22: flange pipes |
| 23: cover |
| 24: fixing member |
| 30: disk |
| 31: coupling hole |
| 32: lifting nut |
| 33: hermetic protrusion |
| 34: support slopes |
| 35: engaging grooves |
| 40: operating rod |
| 41: locking protrusion |
| 211: jaw part |
| 231: insertion hole |
| 232: operating groove |
| 241: fastening holes |
| 242: fixing tubes |
| 243: pressing rods |
| 351: upper inclined surface |
| 352: lower inclined surface |

The invention claimed is:

1. A gate valve having a disk replacement structure and disposed in a piping, the gate valve comprising:
 a valve body including a blocking space formed therein, a pair of flange pipes provided to communicate with the blocking space, and a cover coupled to an upper portion of the valve body to close the blocking space;
 a disk provided to be lifted up and down in the blocking space and including a coupling hole in an upper portion of which a lifting nut is disposed; and
 an operating rod disposed in the cover and configured to move the disk up and down,
 wherein the cover is provided with an insertion hole to penetrate through the cover, and the operating rod is rotatably disposed in the insertion hole,
 wherein the valve body is provided with a fixing member configured to support and fix the disk,
 wherein the disk is provided with engaging grooves having an upper inclined surface and a lower inclined surface on both side surfaces or front and rear surfaces to be pressed and fixed by the fixing member, and
 wherein a jaw part is formed on an upper side of the blocking space to protrude inward and
 wherein a hermetic protrusion configured to press the jaw part so as to maintain airtightness of the blocking space is formed in the upper portion of the disk.

2. The gate valve of claim 1, wherein the disk is further provided with support slopes on both sides of an upper portion thereof to be pressed and fixed by the fixing member.

3. The gate valve of claim 1, wherein the lifting nut is disposed on an upper portion of the coupling hole,
 wherein the disk is moved upward by a forward rotation of the operating rod screwed with the lifting nut so that the flange pipes are opened and the operating rod is inserted into a lower portion of the coupling hole, and
 wherein when the operating rod is rotated in a reverse direction, the disk is moved downward while closing the flange pipes.

4. The gate valve of claim 1, wherein the fixing member comprises a pair of fastening holes formed in the valve body in an oblique or horizontal direction and communicating with the blocking space, fixing tubes inserted into and fixed to the fastening holes and having a threaded portion formed on an inner circumferential surface thereof, and pressing rods which are screwed with the fixing tubes and press the disk by rotation.

* * * * *